United States Patent
Weiss

[11] 4,085,436
[45] Apr. 18, 1978

[54] RING LIGHT CONVERTER FOR ELECTRONIC FLASH UNITS

[76] Inventor: Allen Weiss, 188-25 H, 71st Crescent, Fresh Meadows, N.Y. 11365

[21] Appl. No.: 732,220

[22] Filed: Oct. 14, 1976

[51] Int. Cl.$^2$ .................... G03B 15/02; F21V 7/04
[52] U.S. Cl. ............................. 362/16; 350/96.10; 362/31; 362/32
[58] Field of Search ........... 240/1 R, 1 LP, 1 EL, 240/1.3, 2 C, 2.1; 350/96 R; 362/3, 16, 31, 32

[56] References Cited
U.S. PATENT DOCUMENTS

| | | | |
|---|---|---|---|
| 2,259,910 | 10/1941 | Rylsky | 350/96 R |
| 2,360,663 | 10/1944 | Eddy | 350/96 R X |
| 2,515,437 | 7/1950 | Bisch et al. | 240/1 EL X |
| 2,680,844 | 6/1954 | Smith | 240/1 LP X |
| 2,770,712 | 11/1956 | Dros | 240/2.1 |
| 3,474,242 | 10/1969 | Forrant | 240/1.3 |

*Primary Examiner*—Fred L. Braun
*Attorney, Agent, or Firm*—Friedman, Goodman & Teitelbaum

[57] ABSTRACT

An attachment to an electronic flash unit for converting the unit into a photographic ring light for use with a camera, the attachment including a body member and a plate member attached thereto, with both the body and plate members being fabricated from a transparent material such as an acrylic plastic. The body member has a centrally located opening extending therethrough to define a torus-like configuration. Except for a front surface of the body member and a bottom surface of the base member, these members are covered with a light reflecting material disposed against the remaining outer surfaces thereof. A lens mounting adapter is secured in the opening of the body member for coaxially mounting a camera lens so that the uncovered front surface of the body member faces in the same direction as the camera lens. A mounting member positions the uncovered bottom surface of the base plate against a light emitting portion of the electronic flash unit so that the light from the unit is transmitted through the base plate and into the body member where the light is dispersed throughout the body member and uniformly reflected out through the uncovered front surface of the body member to provide a ring light effect around the camera lens.

8 Claims, 7 Drawing Figures 4,085,436

RING LIGHT CONVERTER FOR ELECTRONIC FLASH UNITS

BACKGROUND OF THE INVENTION

This invention relates to a light source for photography, and more particularly to a ring light converter for a conventional electronic flash unit, such as a strobe light.

In photography, it is common to utilize an artificial light source for indoor pictures or when there is insufficient natural light. Typically, most modern day cameras utilize electronic flash units, such as strobe lights. However, such electronic flash units are attached to the camera at a singular position spaced from the lens. As a result, in taking pictures at relatively short distances, the electronic flash unit will produce a shadow on the subject and thus cause a loss of detail of the subject.

To avoid such problems, photoflash and electronic flash units known as ring lights have been developed. These units comprise a flash tube formed in a circular shape and adapted to be mounted on a camera so as to encircle the lens of the camera and thereby provide a source of nearly constant illumination around the periphery of the lens. However, such ring lights are expensive due to the formation of the circular light source therein, and are generally fragile and difficult to work with. They also require large power sources, which increase the weight of the unit and make them difficult to carry and use.

U.S. Pat. No. 3,474,242 teaches a photographic ring light which attempts to alleviate the aforementioned problems. In that patent, a horse shoe-like casing is disclosed to provide a gap therein. A flash lamp is disposed in a socket within the gap of the casing, and by means of dimensioning the casing as well as utilizing a plurality of reflecting surfaces, such as serrations, the light from the flash lamp is transmitted around the casing and reflected outwardly therefrom.

Although the aforementioned patent eliminates the necessity of an active circular tube, the "passive" ring light described obviously cannot produce a uniform source of light completely around the lens. Since the casing is incomplete because of the gap, the housing essentially represents a "C" configuration and cannot provide a complete 360° illumination around the lens. Additionally, because of its particular configuration, the referenced ring light cannot inherently provide uniform illumination around the lens.

As a result, the aforereferenced patent describes that the housing is shaped to increase in thickness in the vicinity of the light source both in a radial dimension and in a dimension parallel to the lens axis to thereby compensate and increase the amount of light coupled from the light source into the opposed spaced end faces of the housing. Furthermore, the rear face includes a plurality of serrations which serve as individual reflecting surfaces for the light transmitted through the casing from the source. Also, opposed end faces adjacent to the light source have serrated surfaces for transmitting the light into the casing. As a result of such modifications in the dimension as well as the formation of the serrations, the aforementioned unit is complex to utilize, extremely expensive to make, is cumbersome and not very practical. It cannot provide a uniform light throughout its area, and cannot provide a complete 360° illumination around the lens. Furthermore, it utilizes its own light source, flash bulb and necessary electrical components, which further complicates matters in that it still requires the necessity for a user to purchase two independent flash units, one for conventional use and one for ring light use. There is also the high cost of flash bulbs which must be replaced with each picture.

SUMMARY OF THE INVENTION

It is accordingly an object of the present invention to provide a ring light which avoids the aforementioned problems of prior art devices.

A further object of the present invention is to provide a ring light converter which can be utilized in conjunction with a conventional electronic flash unit, such as a strobe light, converting it to a ring light flash unit.

Another object of the present invention is to provide a ring light converter which can provide 360° illumination around a camera lens.

A further object of the present invention is to provide a ring light converter for electronic flash units, which provides a uniform light around the entire lens barrel.

Still another object of the present invention is to provide a ring light converter for electronic flash units which is simple in construction, inexpensive to manufacture, easy to utilize, efficient, and practical.

Yet another object of the present invention is to provide a ring light converter for electronic flash units which can be axially mounted on a camera lens and provide uniform illumination therearound while utilizing a conventional electronic flash unit as the source of illumination.

Briefly, the present invention provides a ring light converter for electronic flash units for use with a camera, the converter comprising a body member and a plate member connected together, with both members being fabricated from a transparent material such as an acrylic plastic. The body member has a centrally located opening extending therethrough to define a torus-like configuration. A front surface of the body member and a bottom surface of the plate member are exposed to provide window-like surfaces. The remaining outer surfaces of these members are covered with light reflecting means so that the reflecting surfaces are disposed against the outer surfaces to reflect light through the members. Lens mounting means are secured in the opening for coaxially mounting a camera lens to face in the same direction as the uncovered front surface of the body member. Connecting means position a light emitting portion of the electronic flash unit against the uncovered bottom surface of the plate members, whereby the light from the unit is transmitted through the plate member into the body member, where the light is then dispersed throughout the body member and uniformly reflected out through the uncovered front surface to provide a ring light effect around the camera lens.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which.

In the various figures of the drawing, like reference characters designate like parts.

DESCRIPTION OF THE PREFERRED EMBODIMENT

Figure 1:
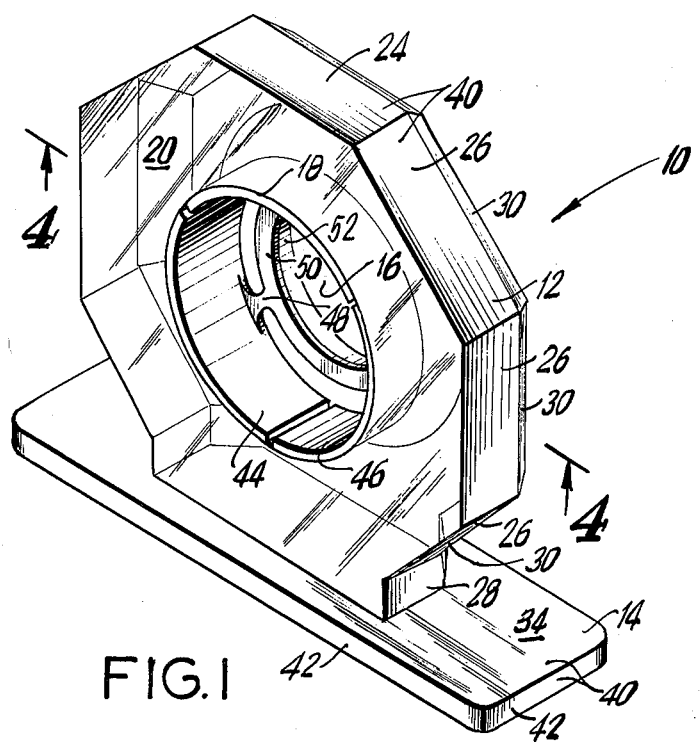
FIG. 1 is a front perspective view of the ring light converter of the present invention.

Referring now to the drawing, FIGS. 1-4 show the converter 10 of the present invention. The converter 10 includes a body member 12 and a flat base or plate member 14. The body and plate members may be integrally molded together as one piece, or may be integrally connected together by conventional securing means well known in the art such as clear cement, clear adhesive and the like. Both the body and plate members are fabricated from a transparent material, such as an acrylic plastic, and more particularly from a clear plexiglass, so that light can pass through and between the members.

The body member 12 has a torus-like configuration, having a centrally located opening 16 extending therethrough to provide a continuous cylindrical inner wall 18 disposed between a front wall 20 and a rear wall 22 of the body member. The top wall 24 and the side walls 26 provide an octagonal-like outer wall. The bottom neck portion 28 extends downwardly with the bottom wall thereof being secured to the plate member 14. The octagonal-like shaped outer wall may have other similar configurations with more or less than eight sides, or may even have a circular-like configuration.

Additionally, the rear wall 22 includes beveled surfaces 30 adjacent to the outer wall and extending therewith almost completely around the body member 12, where the beveled surfaces terminate at the plate member 14 on each side of the neck portion 28. It is noted, that the beveled surfaces 30 are similar to the octagonal-like shape of the outer wall. Furthermore, the rear wall includes a frustroconical beveled surface 32 adjacent to the inner wall 18 and extending continuously therewith.

Figure 2:
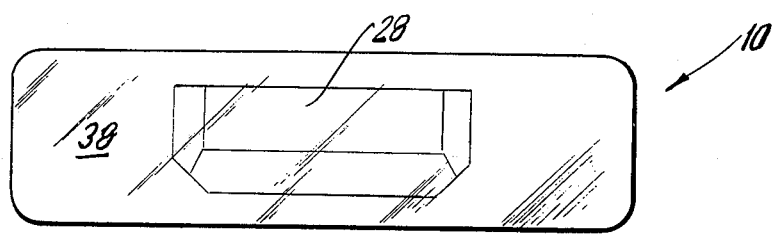
FIG. 2 is a bottom view thereof.
Figure 3:
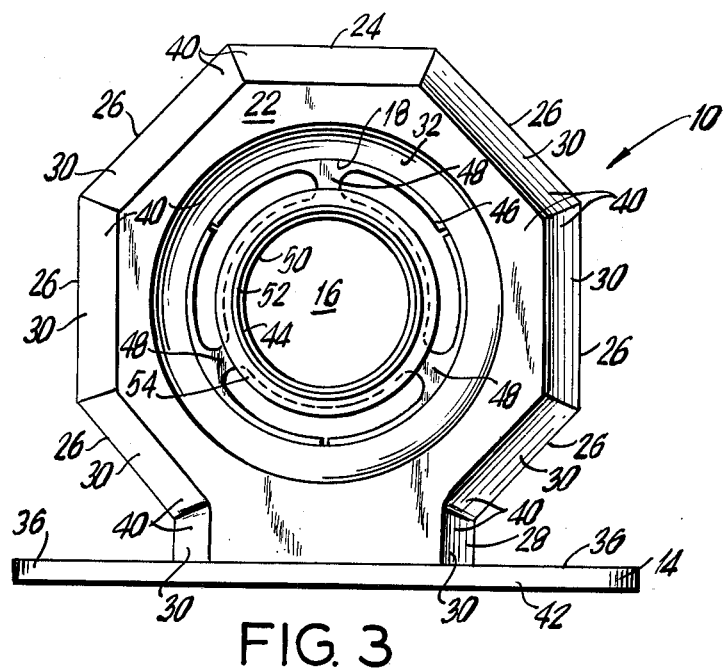
FIG. 3 is a rear view thereof.

It is noted, that both the front and rear walls extend downwardly into the neck portion 28, and form a part thereof. The neck portion 28 is attached or integrally connected to a top surface 34 of the plate member 14, being centrally located thereon to provide flange-like portions 36 on either side thereof. FIG. 2 shows the bottom surface 38 of the base plate 14, which will be described hereinafter below.

Figure 4:
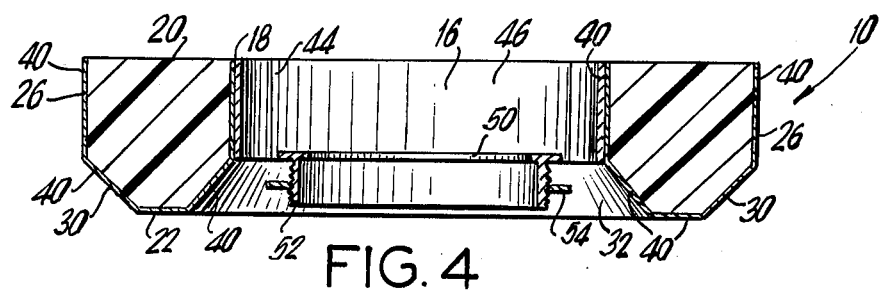
FIG. 4 is a cross sectional view taken along line 4—4 of FIG. 1.

In order to obtain reflections within the converter 10, the assembled body and plate members 12, 14 are covered or coated with a conventional reflective material 40 to provide a mirror-like surface within these members. Accordingly, as indicated in FIG. 4, the reflective material 40 is disposed against the outer walls 24, 26, the inner wall 18 and the rear wall 22 including the beveled surfaces 30, 32 and the neck portion 28 extending therefrom, in addition to being disposed against the unconnected portions of the top surface 34 of the plate member 14 and the side edges 42 thereof. Accordingly, the reflective surfaces of the reflective material 40 are directed into or face inwardly of the body and plate members, so that the reflective surfaces are visible through the uncovered front wall 20 as indicated in FIG. 1, and through the uncovered bottom surface 38 of the plate member as indicated in FIG. 2. It is noted, that the neck portion 28 is visible through the bottom surface 38 of the plate member.

The covering or coating can be a silver finish which is vacuum metalized, plated or painted on the above-mentioned outer surfaces. Thus, the front wall 20 is in light communication with the bottom surface 38 of the base member, where light can be transmitted through the converter 10 between these two surfaces. It is also noted that the beveled surfaces 30, 32 increase the number of reflective surfaces and provide these reflective surfaces at different angles to define a trough-like effect for efficiently distributing the light around the body member in a uniform manner as set forth below.

A lens mounting member, shown generally as 44, is positioned in the opening 16 against the inner wall 18 of the body member 12. By way of example, the mounting member 44 includes an outer ring 46 which is secured by conventional means to the inner wall 18, such as by cement, adhesive, a bonding agent, or by a press fit engagement therebetween. Spokes 48 extend inwardly from the ring 46 and support a hub 50. The hub 50 is provided with an axially extending cylindrical flange 52, which is externally threaded and provided with a threaded locking nut 54 thereon.

Figure 5:
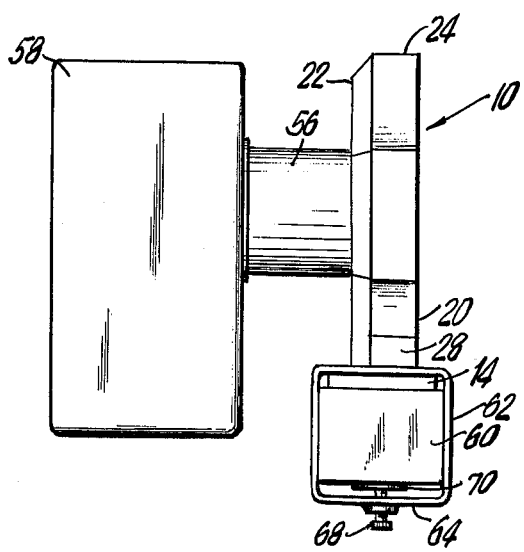
FIG. 5 is a schematic view showing the converter of the present invention connected to a camera and an electronic flash unit.

As shown in FIG. 5, a lens 56 of a camera 58 is inserted from the rear side of the converter 10 into the opening 16 so that the lens 44, which is conventionally threaded, is threadedly engaged on the externally threaded flange 52, with the lock nut 54 being rotated against the lens to lock the lens in position on the flange 52. In this manner, the lens 56 is in coaxial alignment with the opening 16, where the lens 56 faces in the same direction as the front wall 20. Additionally, a conventional flash unit 60, such as a strobe unit, is positioned against the plate member 14, with the light-emitting portion of the flash unit 60 being disposed against the bottom surface 38 of the plate member 14. Clamp members 62 secure the flash unit 60 to the plate member 14.

Figure 6:
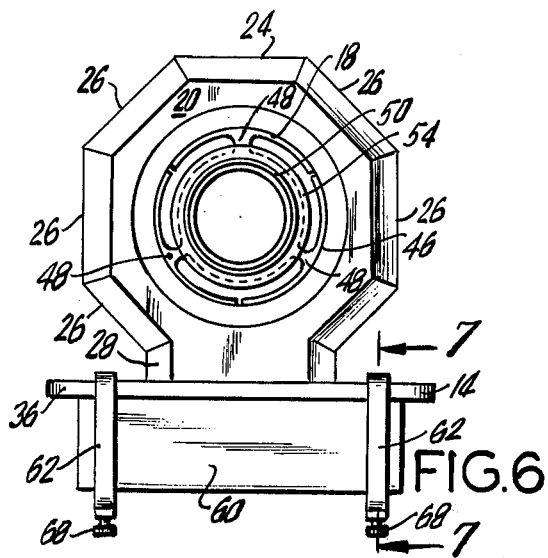
FIG. 6 is a front view showing a clamping arrangement between the converter and the electronic flash unit.
Figure 7:
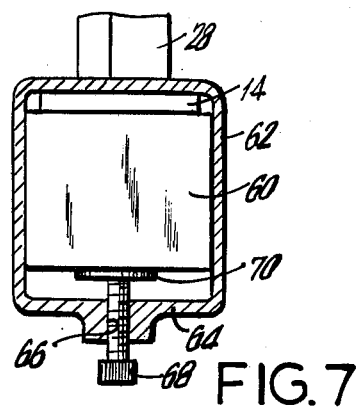
FIG. 7 is an enlarged cross sectional view taken along line 7—7 of FIG. 6.

As shown in FIGS. 5-7, each clamp member 62 is a rectangularly shaped sleeve or frame element providing an opening therethrough. One side portion 64 is provided with a threaded hole 66 therethrough for receiving a clamping screw 68. The screw 68 is provided with a pressure plate 70 for engagement against the flash unit 60. Each clamping sleeve 62 is slid over both the flange-like portion 36 of the plate member 14 and the flash unit 60, one sleeve clamp 62 being disposed at each end thereof. The screws 68 are tightened to thereby hold the flash unit in alignment against the bottom surface 38 of the base member 14 to insure registration of the light-emitting portion of the flash unit, so that all the light from the flash unit passes directly into the base or plate member 14. Obviously, the sleeve clamp 62 will accommodate flash units of various height sizes by threadedly engaging the screws 68 therewith, however it is understood, that sleeve clamps of different widths may be used for wider flash units.

In operation, as the flash unit is triggered to produce a light, the light passes through the base member 14 and upwardly into the neck portion 28, where the light then strikes against the reflected surfaces of the inner wall, outer wall and rear wall including the beveled surfaces thereof, so that the light is reflected within the trough-like arrangement and is distributed uniformly completely around the opening 16 within the body member 12. Finally, the light is reflected through the front wall 20, which is the only uncovered wall of the body member, where the light will be directed outwardly therefrom. Because of the complete distribution of the light within the base member 12, a uniform light output will be effected completely around the lens 56 of the camera, which will appear to occur simultaneously with the flash of light from the flash unit. In this manner, a ring-like effect is produced converting the flash illumination from the flash unit into a ring-like flash.

By forming the inner wall as a complete and continuous cylinder around the lens, and by also forming the body member continuously around the lens, there is provided a 360° illumination around the lens. Furthermore, by forming the body member in a substantially uniform torus-like configuration with a substantially uniform cross section, uniform illumination is achieved by the light emitted through the front wall. Additionally no separate source of illumination is needed, where the conventional electronic flash unit can be used with the converter 10 of the present invention to provide a ring-like flash unit.

Although the neck portion 28 is shown to interconnect the body member with the plate member, it is understood that the plate member can be directly coupled to the body member without the need of such a neck portion. However, the neck portion provides a convenient means of forming the converter of the present invention and providing direct registration of the flash unit with the converter.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. An attachment to an electronic flash unit for converting the unit into a photographic ring light for use with a camera, said attachment comprising:
    a body member having a flat front wall, a rear wall, a top wall, side walls and a flat bottom wall, said flat bottom wall being disposed in a perpendicular relationship with said flat front wall, said body member including a centrally disposed opening extending therethrough from said front wall to said rear wall to provide a continuous 360° cylindrical inner wall disposed between said front and rear walls to define a torus-like configuration;
    a plate member having a flat top surface, a flat bottom surface and side edges disposed between said top and bottom surfaces, said flat top surface of said plate member being connected to said flat bottom wall of said body member;
    said body and plate members being fabricated from a transparent material to permit light to pass through and between said members;
    reflective means disposed against and covering said rear, top, side and inner walls of said body member and covering unconnected portions of said top surface and side edges of said plate member for directing light through said attachment from said bottom surface of said plate member to said front wall of said body member in a perpendicular path, said bottom surface and front wall being uncovered by said reflective means
    said rear wall of said body member including beveled surfaces to provide a trough-like arrangement for distributing the light around said body member and directing the light outwardly from said front wall of said body member completely around said opening to obtain a uniform illumination from said body member;
    whereby said attachment is adapted for mounting a camera lens in coaxial alignment with said opening and also is adapted for mounting a light-emitting portion of the electronic flash unit against said uncovered bottom surface of said plate member.

2. An attachment as claimed in claim 1, wherein said transparent material is acrylic plastic.

3. An attachment as claimed in claim 1, wherein said body member and said plate member are integrally connected together in a one piece construction.

4. An attachment as claimed in claim 1, wherein said body member has a substantially uniform cross section.

5. An attachment as claimed in claim 1, wherein said reflective means is a silver finish coated on said body and plate members.

6. An attachment as claimed in claim 1 including means secured in said opening for mounting the camera lens in coaxial alignment with said opening.

7. An attachment as claimed in claim 1 including clamp means attachable to said plate member for mounting the flash unit against said plate member.

8. An attachment as claimed in claim 1, wherein said top and side walls of said body member provide an octagonal-like configuration.

* * * * *